United States Patent Office 3,052,558
Patented Sept. 4, 1962

3,052,558
PREPARATION OF FOOD PRODUCTS
Eugene J. Rivoche, Washington, D.C., assignor to Rivark Research and Development Corporation, a corporation of Indiana
No Drawing. Filed Jan. 27, 1959, Ser. No. 789,267
5 Claims. (Cl. 99—192)

This invention relates to improvements in the preparation of food products, and is a continuation-in-part of my co-pending application Serial No. 633,534, filed January 11, 1957 now Patent No. 2,887,382.

In one aspect the invention relates to an improved method for mixing hydrophilic colloids such as methyl cellulose, alginates, pectinates, and the like, with starch to give a new combination for use in food products. It is known to mix small amounts of cellulose gums in weak starch solutions to more homogeneously suspended the starch particles and act as a starch stabilizer. Such mixtures are used as thickening agents to provide a more uniform thickening action than starch alone. Both materials contribute to the thickening action. This uniformity of action is avoided in the present invention, which has for its object provision of a starch-hydrophilic colloid mixture in which the action of the two materials after cooking is not homogeneous but entirely different, one substance providing a gel mass and the other becoming liquid or juicy. According to the invention, discrete, partially pre-gelled starch particles are suspended in hydrophilic colloid solution so that such starch particles do not affect the characteristics of the suspending solution itself. Thus, after partial pre-gelling, starch no longer goes into solution in an aqueous suspending medium. This product is very desirable for incorporation in many types of food products and is particularly desirable for incorporation in products which are to be frozen and then cooked, such as, for example, frozen fruit pies and the like. In such products, the starch gel is destroyed by the freezing and thawing action and becomes juicy on cooking, whereas the hydrophilic colloid suspending said starch may be in gel form which is either retained or formed during cooking.

Partially pre-gelled starch, as the expression is used herein, may be prepared by cooking a suspension of starch particles in water several minutes until the starch goes into solution and a soft semi-gel is formed. If the water-starch solution is cooked too long, it is transformed into a hard, rubbery gel which cannot be used in the present process because of the difficulty in mixing such a mass with the colloid solution and fruit or other food, and further because a hard-gelled starch particle will not soften on cooking, even after it has been subjected to freezing and thawing action. On the other hand, a partially pre-gelled starch particle after freezing and thawing and upon cooking, as in a pie filling, becomes very juicy.

Another object of the invention is to provide a means for controlling the viscosity of the liquid starch globules in the final cooked product. This is accomplished by adding sugar to the starch solution in varying amounts prior to the partial gelling operation. The more sugar added, the more viscous in the juice in the final product.

By using partially pre-gelled starch particles in the form of a suspension in another colloid solution, such as a methyl cellulose solution, mixing of starch with fruits and other products of a delicate structure may be accomplished with less damage to the product. Where hard solids or viscous solutions are mixed with thawed fruits, the mass is quickly reduced to a pulp. By using soft semi-gel, starch-like particles suspended in a less viscous liquid, the fruits are not only more readily mixed but are protected to some extent from the mechanical action of the mixer. Thus, the fruits soon become coated with the semi-gel material, which acts in the nature of a lubricant to permit the fruits to slip over one another and over the surfaces of the mixing device with minimum abrasive effect.

By the term "starch" is meant any of the starchy flours commonly used in the food industry, including wheat flour, corn starch, rice flour, and the like.

In another aspect, the invention relates to improvements in preparation of frozen food products from moisture containing, cellular foods and, in particular, to preparation of frozen food products from ingredients which have been previously preserved by freezing, such as, for example, the preparation of frozen fruit or berry pies from previously frozen fruits or berries. The invention may also be utilized with advantage in making any food product from previously frozen natural foods having a relatively high moisture content, where it is desirable to restore such foods to their natural appearance and texture after thawing.

Practically the whole frozen fruit pie industry is using berries and fruits which have previously been preserved through freezing. The fruits or berries are delivered frozen to the manufacturing plant. There, the frozen quantities of strawberries, cherries, peaches, or the like, are thawed and the juices drained out, the juices representing from about 30 to 35% by weight of the frozen materials. These juices are usually mixed with starch and the desired quantity of sugar added. The mixture is then cooked for a few minutes until the desired viscosity and clarity are obtained. The cooked, starchy mass is then mixed back with the fruit from which the juices were drained, that is, with the thawed and drained cherries, berries, or the like. This mixture is utilized as the filling for the pie crusts, and after packing in such crusts they are frozen and delivered to the consumers as frozen pies. These pies must be placed in an oven and cooked about 45 minutes. The final product while good, is not completely satisfactory because the fruit or berries in thawing and in the loss of the approximately 30% by weight or more of juice become tasteless, flaccid masses of a texture in no way resembling the freshly cooked fruit or berry. Moreover, after the pies are cooled, the product is soupy and the fruits or berries do not hold together. The bottom of the pie crust is soggy and in most instances hard to remove from the pan.

The present invention has for an object the overcoming of the aforementioned difficulties.

According to the second aspect of the invention, frozen fruits, berries or the like, after they are thawed and after the juice is drained off, are re-impregnated with a gel-forming solution. This solution may consist of previously drained juice in which methyl cellulose, sodium alginate, or other gel-forming hydrophilic colloid has been dissolved. For example, the drained juice is mixed with any desired quantity of methyl cellulose in view of obtaining a solution having a viscosity adapted to the particular requirement of the manufacturer, bearing in mind the type of fruit he is using. Alternatively, a water-soluble alginate or pectinate along with a substance capable of slowly releasing calcium ions, and a buffer salt, if necessary, may be used to form a solution with the fruit juice. In this instance, gel formation takes place in situ after impregnation of the fruit. It has been found that frozen and thawed fruit is readily impregnated with the colloid solutions. Thus, the operation is a relatively fast one, requiring no prolonged impregnating time.

The gel-forming characteristics of methyl cellulose are not affected by freezing and thawing. Accordingly, when the frozen pies are cooked, the juice inside the fruit or berries becomes hard due to gel formation, and as moisture is evaporated during the cooking operations, the fruit or berry remains in firm, attractive form due to the concentration of the methyl cellulose solution.

Another advantage of saturating the juices with the hydrophilic colloid gel-forming solutions of the type described is that in addition to forming clear, tasteless binding and gelation agents, they are easily controlled from the standpoint of viscosity, and of the quality of the obtained gel. Any quantity of sugar and starch can be added to the fruit with the colloid solution to form the final pie filling. Where methyl cellulose solution is used, the sugar is preferably mixed with the fruit or other ingredients. Methyl cellulose solutions are sensitive to sugar and if sugar is to be dissolved in such solution, the concentration should not be over 30%. The manner in which the starch can be added to the colloid solution is another feature of the invention, as previously mentioned.

The use of a methyl cellulose solution for impregnation of the fruits permits the resulting pies to be placed on the market in either raw or precooked frozen form. Thus, during a precooking operation, the methyl cellulose solution forms a gel from which water is evaporated so that the methyl cellulose becomes more highly concentrated. On cooking, the concentrated solution remains in highly viscous or gel form and its characteristics are not altered by subsequent freezing and thawing. If the pies are frozen without precooking, the solution also retains its gel-forming properties when eventually cooked.

With alginates and pectinates, it is necessary that the solutions be formed, the fruits impregnated, and the gel-formation within the fruit take place at approximately 0° C. and not over 4° C. if the resulting gel is to be resistant to freezing and thawing action. The manner in which alginate and pectinate gels, including freeze-resistant gels, are formed is described in greater detail in my Patent No. 2,791,508.

The use of gel-forming hydrophilic colloids in the fruit-juice solutions rather than starch, as previously utilized, is advantageous in that they do not adversely affect the taste and do not become fluid upon heating. This allows one to use the pies practically oven-hot without loss of juices. They can be cut without cooling and the inside is in attractive gel-like form with the berries or fruits appearing firm and plump.

Another advantage of the use of the gel-forming, heat-resistant hydrophilic colloids in the pie-making process is that juices impregnated with these substances are transformed into a gel which does not soak through the bottom of the pie during cooking. The alginates and pectinates are transformed into gels before cooking, and methyl cellulose gels at cooking temperatures. However, with the latter colloid, in the cooking operation, gelation is obtained very fast since methyl cellulose solution forms a gel at temperatures of about 135° F. and above. After gel formation has taken place, the pie crust is protected during the entire cooking time. Just the opposite effect occurs during the usual process of preparing fruit and berry pies. In the usual method, as soon as pies warm up in the oven, the juices mixed with starch become liquid and the longer the pie cooks, the more liquid they become, thus before the pie is done practically saturating the entire bottom of the pie crust. The result is that it is practically impossible to take a hot piece of pie out of the container. In most cases, the product resulting from a cooked or frozen pie cannot be eaten hot or even warm without difficulty. In an overwhelming number of cases, even after cooling for one or two hours, the bulk of the crust is so mushy and soft that a definite piece is impossible to cut out.

The invention will be further described by the following examples of practice:

*Example I*

A 100-pound batch of fresh frozen cherries is thawed and drained, the amount of juice being collected being about 30 pounds and the retained cherries being about 70 pounds. This drained juice is brought to a temperature of between about 180° F. and the boiling point, about 3 to 6 pounds of sugar are added, and about 0.3 to 0.6 pound of methyl cellulose of desired viscosity and grade is added. After a few minutes of stirring, the methyl cellulose is homogeneously suspended in the hot juice. The mixture is then transferred to a cooling tank where the solution is gently stirred while cooling to at least below about 70° F. and preferably between 50° F. and the freezing point. A clear solution of methyl cellulose is thereby obtained. The drained fruits are then mixed with the methyl cellulose solution in a mixing tank, after which the pie crusts are filled and the resulting pies subjected to the usual freezing operations. It will be understood that additional sugar can be added directly to the cherries if more sweetness is desired. Likewise, other condiments can be added to either the cherries or the juice.

*Example II*

A 100-pound batch of fresh frozen cherries is thawed and drained, as in Example I, resulting in 30 pounds of juice. A 15-pound portion of the fruit juice is heated to boiling and from about 0.2 to 0.6 pound of methyl cellulose is added to this material. After a few minutes of stirring to completely suspend the methyl cellulose, about 15 pounds of crushed ice are added to thereby cool the mixture to a sufficiently low temperature to put the methyl cellulose in solution. The remainder of the juice is now mixed into the methyl cellulose solution and the combined solution is mixed with the fruit, and the resultant mass used as the pie filler. Sugar may be mixed into either portion of the juice or may be mixed into the fruit itself, if desired. Since the juice is diluted by the water of the ice, the product has a slightly lesser proportion of fruit. However, the disadvantages of this are far outweighed in plumpness provided to the fruit in contrast with the flaccid appearance of such fruit in the normal pie-making operation. It will be understood that different portions of the fruit juice and different amounts of ice may be utilized in placing the methyl cellulose in solution, thereby varying the final concentration of the mixture.

*Example III*

A 100-pound batch of frozen cherries is thawed and drained, providing 30 pounds of juice and 70 pounds of drained cherries. A 20-pound batch of the juice is brought to a boil and utilized to make a methyl cellulose solution, as in either Example I or II, from about 0.2 to 0.6 pound of methyl cellulose being utilized. The remaining 10 pounds of juice are mixed with from about ½ to 2 pounds of starch, the starch being suspended in the juice. This mixture is then brought to a boil and cooked for a few minutes until the starch is transformed into a gelled mass, 3 or 4 minutes usually being required. The partially gelled mass, after cooling, is then mixed with the methyl cellulose solution so as to divide it into small, discrete particles which are suspended homogeneously within the methyl cellulose solution. The resulting mixture is then mixed with the 70 pounds of drained cherries to which sugar has been added in the desired quantity, and this mass is utilized as filling for pie crusts.

The pies are then frozen in the usual manner and when the frozen pies are cooked, the methyl cellulose solution forms a gel. However, the partially gelled particles of starch which have been suspended in the methyl cellulose solution are no longer in gel form, due to the effect of the freezing, thawing and cooking. The starch, however, remains homogeneously suspended in the methyl cellulose solution and is retained therein during the period in which the methyl cellulose gels and hardens in the cooking operation. The evenly distributed starch globules provide a relatively juicy and pleasing taste characteristic without providing the disadvantages of a starch solution alone. Thus, the starch globules are prevented from draining into the pie crust so that the latter will remain firm and crispy. Furthermore, the methyl cellulose will provide sufficient body to enable a slice of pie to be cut and removed from the whole.

*Example IV*

A 100-pound batch of frozen cherries is thawed and drained as in the preceding examples. The juice is cooled to 0° C. or slightly below and is mixed with from 20 to 25% by weight of sugar, from 1 to 2% by weight of sodium or potassium alginate, and with a suitable quantity of a relatively insoluble calcium salt and a buffer salt, if required. About 0.25% by weight of calcium citrate based on the weight of the juice is satisfactory, with or without a buffer salt. Alternatively, about 0.3% calcium tartrate with from 0.05 to 0.1% sodium hexametaphosphate as a buffer may be used. From 0.15 to 0.17% tricalcium phosphate with from 0.5 to 0.75% sodium hexametaphosphate is also satisfactory. After mixing the sugar, alginate, calcium salt and buffer (if required) into the juice, the resulting solution is mixed in a cold room with the cherries and the resulting mass, while maintained at about 0° C. is used to fill the pie pastries. The acidity of the juice releases calcium ions from the calcium salt, which in turn causes the alginate to form an insoluble gel. The temperature is controlled so that gel formation takes place at about 0° C. The resulting pies are then frozen, and the gel is not destroyed by freezing. The pies do not become mushy or overly juicy on cooking, and the cherries retain their attractive appearance and texture.

*Example V*

A 100-pound batch of frozen cherries is thawed and drained, as in the preceding examples, to provide 30 pounds of juice. A 20-pound batch of juice is cooled to 0° C. and mixed with 0.3 to 0.6 pound of sodium alginate. The remaining 10 pounds of juice are mixed with ½ to 2 pounds of starch and 0.75 pound of calcium citrate, the suspension then being brought to a boil to dissolve the starch and form a starch gel. The starch gel, which now contains the calcium for gelling the alginate, is cooled and mixed with the alginate-containing juice, the temperature being controlled at about 0.° C. Particles of starch gel are homogeneously suspended in the alginate juice. This mass is then mixed with the cherries and with about 20 to 25 pounds of sugar, and the resulting mass is used to fill the pie pastries which are then quick-frozen. An alginate gel is formed by release of calcium ions either before the freezing operation or during the eventual cooking of the frozen pies. The starch gel, on cooking, becomes fluid and imparts a desired juiciness without making the cooked pie crust mushy.

It will be understood that the method of incorporating starch in colloid solutions may be utilized in a great many different food operations, the foregoing merely being illustrative of one of its advantageous forms. Further, while the specific examples of practice relate to frozen cherries, any other suitable fruit, berries or other food ingredient in frozen form may be utilized. Thus, peaches, strawberries, blackberries, gooseberries, apples, rhubarb, and many other pie-making materials may be similarly treated.

I claim:

1. A process for preparing frozen food products from a frozen natural food material having a relatively high moisture content, comprising thawing said frozen natural food material to provide a mass containing liquid and solid fractions, draining the liquid fraction from the thawed material, mixing at least a portion of said liquid with a hydrophilic colloid having gel-forming properties which are not affected by freezing and subsequent thawing to provide a hydrocolloid solution, suspending relatively soft viscous particles of partially gelled starch in said hydrophilic colloid solution, mixing the hydrocolloid-starch suspension with the thawed, drained food material, and refreezing the mixture.

2. The process of claim 1 wherein said hydrophilic colloid is a water-soluble alginate and gel-formation takes place at freezing temperatures prior to hard freezing the final product.

3. The process of claim 1 wherein the natural food material is a fruit and the hydrophilic colloid is methylcellulose.

4. In a method for preparing fruit pies the steps comprising: thawing a batch of frozen fruit, draining the juice from the thawed fruit, mixing a portion of said juice with methyl cellulose to provide a methyl cellulose solution, mixing another portion of said juice with starch to provide a starch suspension, boiling said suspension to place said starch in solution and to form a partially gelled, starch mass, homogeneously suspending particles of said partially gelled mass in the methyl cellulose solution, mixing the resulting suspension with the thawed fruit to provide a pie filling.

5. In a method for preparing fruit pies, the steps comprising: thawing a batch of frozen fruit, draining the juice from the thawed fruit, mixing a portion of said juice at substantially freezing temperature with a water-soluble alginate, mixing another portion of said juice with starch and a relatively insoluble compatible calcium salt, boiling said starch-calcium salt mixture to form a starch gel, cooling said starch gel and homogeneously suspending particles thereof in said alginate solution, mixing the resulting suspension with the drained fruit and freezing the product.

References Cited in the file of this patent

UNITED STATES PATENTS

| | | |
|---|---|---|
| 2,617,734 | Chapple | Nov. 11, 1952 |
| 2,668,117 | Bucci | Feb. 2, 1954 |
| 2,785,075 | Malecki | Mar. 12, 1957 |
| 2,788,281 | Guadagni | Apr. 9, 1957 |
| 2,863,700 | Spieser | Dec. 9, 1958 |
| 2,887,382 | Rivoche | May 19, 1959 |